(12) United States Patent
Kitamoto et al.

(10) Patent No.: US 12,304,331 B2
(45) Date of Patent: May 20, 2025

(54) POWER SUPPLY CONTROL SYSTEM AND POWER SUPPLY CONTROL METHOD

(71) Applicant: HONDA MOTOR CO., LTD., Tokyo (JP)

(72) Inventors: Ryota Kitamoto, Wako (JP); Kenichi Shimizu, Tokyo (JP); Yuki Kuwano, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 562 days.

(21) Appl. No.: 17/382,394

(22) Filed: Jul. 22, 2021

(65) Prior Publication Data
US 2022/0024326 A1   Jan. 27, 2022

(30) Foreign Application Priority Data

Jul. 27, 2020  (JP) ................................. 2020-126683

(51) Int. Cl.
*B60L 50/75* (2019.01)
*H02J 7/00* (2006.01)

(52) U.S. Cl.
CPC ............ *B60L 50/75* (2019.02); *H02J 7/0013* (2013.01); *H02J 7/00714* (2020.01); *B60L 2210/40* (2013.01)

(58) Field of Classification Search
None
See application file for complete search history.

(56) References Cited

U.S. PATENT DOCUMENTS

| | | | |
|---|---|---|---|
| 2010/0136379 A1* | 6/2010 | King | H02J 7/34 429/432 |
| 2012/0020128 A1 | 1/2012 | Umayahara | |
| 2012/0187887 A1 | 7/2012 | Sone | |
| 2016/0133974 A1 | 5/2016 | Kaneko et al. | |
| 2017/0274902 A1* | 9/2017 | Kumada | B60L 50/64 |

(Continued)

FOREIGN PATENT DOCUMENTS

| | | |
|---|---|---|
| CN | 102473941 | 5/2012 |
| CN | 102602299 | 7/2012 |

(Continued)

OTHER PUBLICATIONS

Control method for electric vehicle (Year: 2018).*

(Continued)

*Primary Examiner* — James M McPherson
*Assistant Examiner* — Bakari Underwood
(74) *Attorney, Agent, or Firm* — Amin, Turocy & Watson, LLP

(57) ABSTRACT

A power supply control system includes: an electric device; an inverter; a first drive unit including a first fuel cell system, a first voltage converter, and a first battery; a second drive unit including a second fuel cell system, a second voltage converter, and a second battery; and a control unit that controls the inverter and/or the first fuel cell system so that a first current value flowing through the first battery reaches a target value of the first current value and controls the second voltage converter and/or the second fuel cell system so that a second current value flowing through the second battery reaches the target value of the first current value.

5 Claims, 11 Drawing Sheets

(56) References Cited

U.S. PATENT DOCUMENTS

2017/0365867 A1   12/2017  Tano et al.
2019/0006689 A1*  1/2019  Nada .......................... H02J 7/34
2020/0017043 A1   1/2020  Kato et al.

FOREIGN PATENT DOCUMENTS

| CN | 105591135 | 5/2016 |
| DE | 102015006280 | 12/2015 |
| JP | 2016-103460 | 6/2016 |
| JP | 2019-075926 | 5/2019 |
| JP | 2020-071957 | 5/2020 |
| JP | 2020-095830 | 6/2020 |
| KR | 20180033641 A2 * | 4/2018 |
| WO | 2012/002082 | 1/2012 |

OTHER PUBLICATIONS

Chinese Notice of Allowance for Chinese Patent Application No. 202110807941.6 mailed Jul. 28, 2023.
Japanese Notice of Allowance for Japanese Patent Application No. 2020-126683 mailed Feb. 22, 2022.

\* cited by examiner

POWER SUPPLY CONTROL SYSTEM AND POWER SUPPLY CONTROL METHOD

CROSS-REFERENCE TO RELATED APPLICATION

Priority is claimed on Japanese Patent Application No. No. 2020-126683, filed Jul. 27, 2020, the content of which is incorporated herein by reference.

BACKGROUND OF THE INVENTION

Field of the Invention

The present invention relates to a power supply control system and a power supply control method.

Description of Related Art

Conventionally, as a technology related to a fuel cell system mounted in a vehicle, a technology for controlling the power generation of the fuel cell system on the basis of the required power calculated on the basis of the accelerator depression amount, the temperature of a secondary battery, and the power storage amount is known (see, for example, Japanese Unexamined Patent Application, First Publication No. 2016-103460).

As a configuration in which a plurality of fuel cell systems is mounted in one vehicle, a configuration in which an AC-DC converter, a fuel cell system, and a battery are provided for each of two electric devices as drive units of different systems in order to control driving of the respective electric devices is conceivable.

SUMMARY OF THE INVENTION

In order to efficiently operate the electric device or reduce the cost, the drive unit may be composed of a fuel cell system and a battery, and the electric device may be driven by one AC-DC converter (inverter) using each of the drive units.

However, when the AC-DC converter is shared, since driving one electric device by different drive units is not considered, the battery may be over-charged or over-discharged.

One object of the aspects according to the present invention is to provide a power supply control system and a power supply control method for preventing an over-charging or over-discharging state of a battery in each drive unit when two different drive units cooperate in parallel to drive an electric device using one inverter.

In order to solve the above-described problems and achieve the above-described object, the present invention has adopted the following aspects.

(1) A power supply control system according to one aspect of the present invention includes an electric device; an inverter connected to the electric device to perform conversion from DC power to AC power; a first drive unit including a first fuel cell system that supplies DC power to the inverter, a first voltage converter that controls a voltage of a DC-side terminal of the inverter, and a first battery connected to the first voltage converter; a second drive unit including a second fuel cell system that supplies DC power to the inverter, a second voltage converter that controls a current in the inverter, and a second battery connected to the second voltage converter; and a control unit that controls the inverter and/or the first fuel cell system so that a first current value flowing through the first battery reaches a target value of the first current value and controls the second voltage converter and/or the second fuel cell system so that a second current value flowing through the second battery reaches the target value of the first current value.

(2) In aspect (1), the control unit may perform current control on the second voltage converter such that an acquired value of the first current value in the first voltage converter is used as a target value of the current control.

(3) In aspect (1) or (2), the control unit may perform torque limit control to reduce a torque generated in the electric device by the inverter when the first current value and the second current value exceed a predetermined first threshold current value which is a threshold value of a discharge current for the first and second batteries.

(4) In any one of aspects (1) to (3), the control unit may reduce DC power generated by the first fuel cell system when the first current value exceeds a predetermined second threshold current value set in advance and may reduce DC power generated by the second fuel cell system when the second current value exceeds the second threshold current value.

(5) In any one of aspects (1) to (4), the control unit may be a first control unit in the first drive unit and a second control unit in the second drive unit, and the power supply control system may further include: a first-first current sensor that acquires the first current value used for controlling the first current value of the first voltage converter and outputs the acquired value to the first control unit; a first-second current sensor that acquires the first current value used for the current control of the second voltage converter and outputs the acquired value to the second control unit; and a second current sensor that acquires the second current value and outputs the acquired value to the second control unit.

(6) In any one of aspects (1) to (4), the fuel cell system may further include: a first current sensor that acquires the first current value and outputs the acquired value to the control unit; and a second current sensor that acquires the second current value and outputs the acquired value to the control unit.

(7) A power supply control method according to one aspect of the present invention is a power supply control method for driving a power supply control system including: an inverter connected to an electric device to perform conversion from DC power to AC power; a first drive unit including a first fuel cell system that supplies DC power to the inverter, a first voltage converter that controls a voltage of a DC-side terminal of the inverter, and a first battery connected to the first voltage converter; a second drive unit including a second fuel cell system that supplies DC power to the inverter, a second voltage converter that controls a current in the inverter, and a second battery connected to the second voltage converter; and a control unit, wherein the control unit controls the inverter and/or the first fuel cell system so that a first current value flowing through the first battery reaches a target value of the first current value and controls the second voltage converter and/or the second fuel cell system so that a second current value flowing through the second battery reaches the target value of the first current value.

According to aspects (1) to (7) described above, it is possible to prevent an over-charging or over-discharging state of a battery in each drive unit when two different drive units cooperate in parallel to drive an electric device using one inverter.

DETAILED DESCRIPTION OF THE INVENTION

Hereinafter, embodiments of the present invention will be described with reference to the drawings. An example in which a power supply control system is mounted on an electric vehicle will be described below. The electric vehicle is, for example, a fuel cell vehicle that uses the electric power generated by a fuel cell as the electric power for traveling or the electric power for operating an in-vehicle device. This electric vehicle is an example of an electric device operated by electric power, and is an automobile such as a two-wheeled vehicle, a three-wheeled vehicle, or a four-wheeled vehicle. The electric vehicle may be, for example, a large vehicle such as a bus or a truck in which two drive units including a fuel cell system that will be described later can be mounted in parallel. The power supply control system may be mounted in an electric device other than the electric vehicle (for example, a ship, an air vehicle, or a robot).

Figure 1:
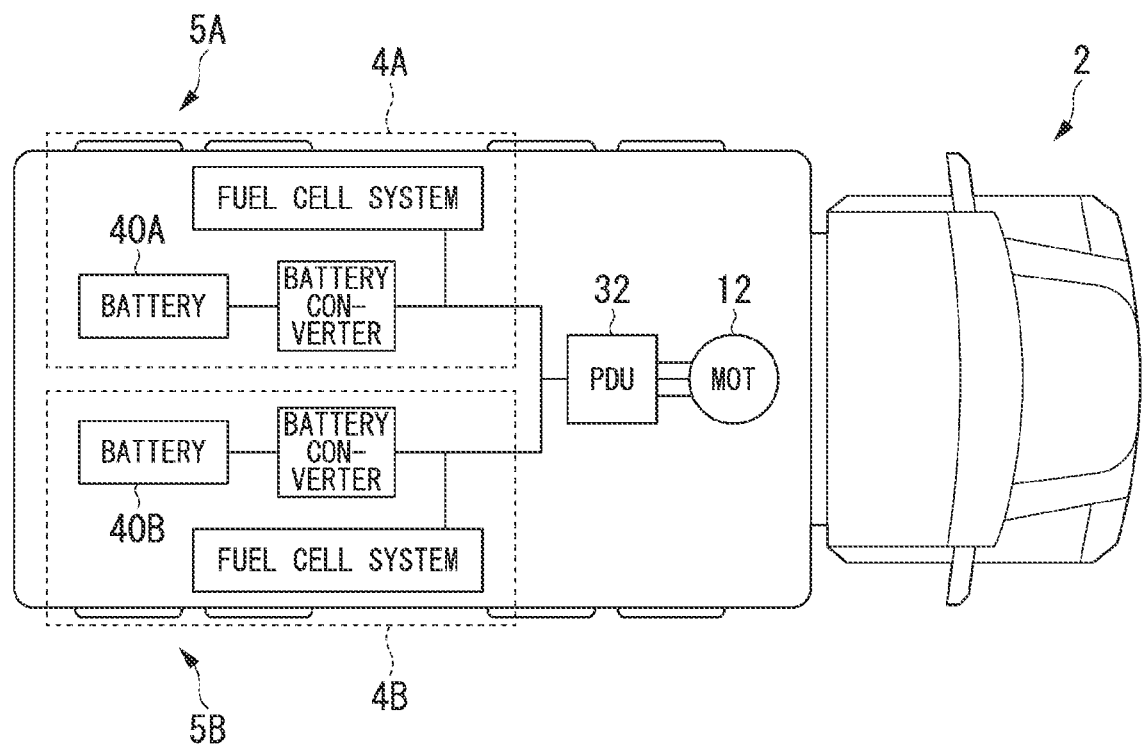
FIG. 1 is a diagram illustrating an example of a schematic configuration of an electric vehicle 1 according to the present embodiment.

FIG. 1 is a diagram illustrating an example of a schematic configuration of an electric vehicle 1 according to the present embodiment. As illustrated in FIG. 1, the electric vehicle 1 includes a cab bag 2, an electric device (MOT) 12, an inverter (PDU) 32, a drive unit 4A (4A #), a drive unit 4B (4B #), wheels 5A, and wheels 5B. In the following description, when the drive units 4A and 4B are not distinguished from each other, they will be described as the drive unit 4 without adding A or B. Similarly, when fuel cell systems 200A and 200B are not distinguished from each other, they will be described as the fuel cell system 200 without adding A or B.

The cab bag 2 is a portion including a driver's seat and the like. The motor 12 (MOT) is driven by the drive units 4A and 4B, and the wheels 5A and 5B are rotated by a transmission (a gearbox) (not illustrated) and a shaft (for example, a propeller shaft) that connects the gears connected to the wheels 5A and 5B. The drive unit 4A includes a fuel cell system 200A, a battery converter 34A, and a battery 40A, and controls the motor 12 in parallel with the drive unit 4B using a common inverter 32. The drive unit 4B includes a fuel cell system 200B, a battery converter 34B, and a battery 40B, and controls the motor 12 in parallel with the drive unit 4A using a common inverter 32. FIG. 1 illustrates an example in which the drive units 4A and 4B of small vehicles, for example, are used in parallel, the DC power from the drive units 4A and 4B is merged at the DC-side terminal of the inverter 32, the torque generated by the motor 12 using the merged DC power is used as the torque required for a large vehicle (truck or the like), and the wheels 5A and 5B are driven.

The schematic configuration of the electric vehicle 1 illustrated in FIG. 1 is an example, and the configuration is not limited to this.

First Embodiment

Figure 2:
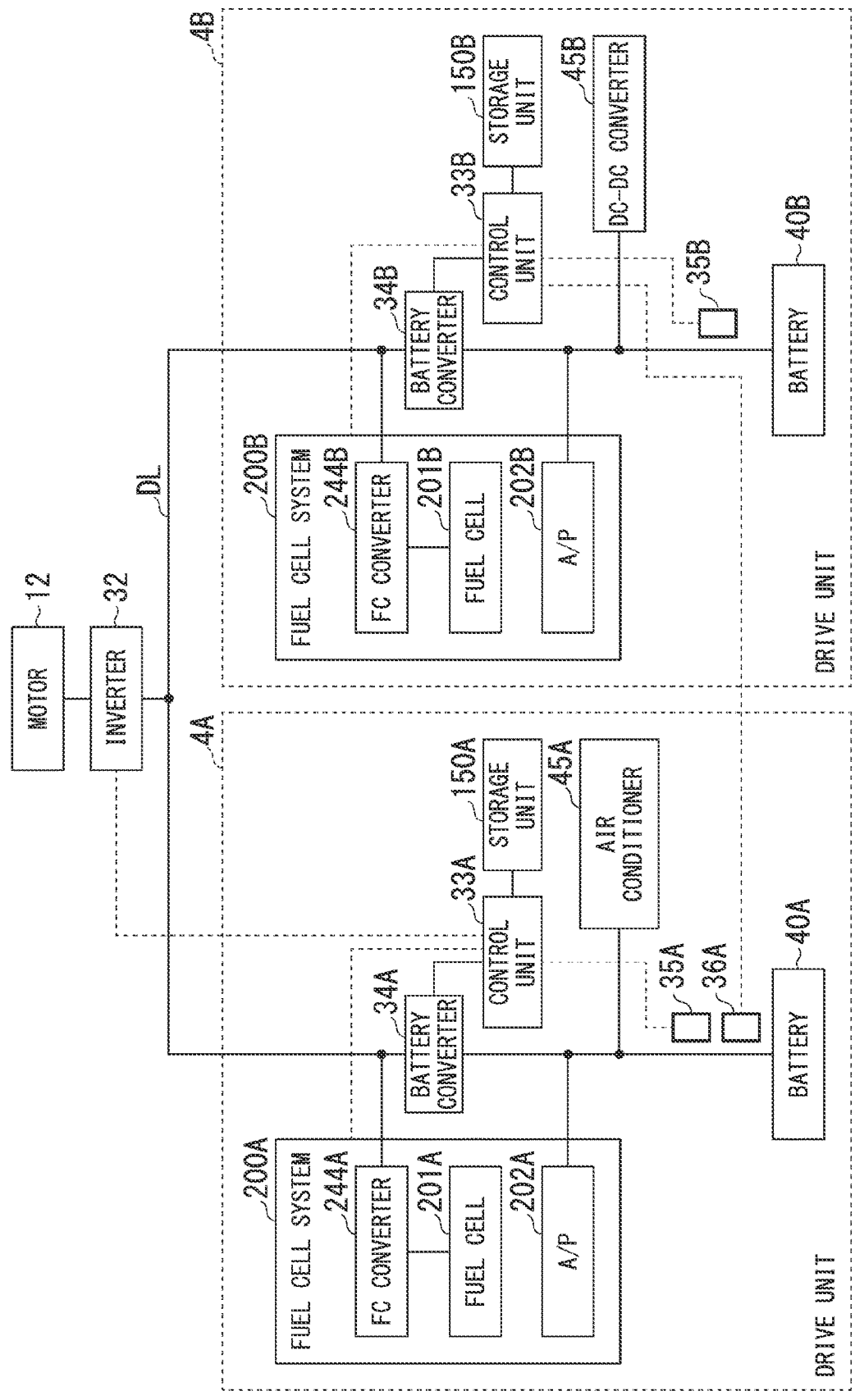
FIG. 2 is a block diagram illustrating an example of a configuration of a power supply control system including a drive unit 4 according to the present embodiment.

Next, a configuration example of the drive units 4A and 4B according to the first embodiment will be described. FIG. 2 is a block diagram illustrating an example of the configuration of the power supply control system including the drive unit 4 according to the present embodiment. As illustrated in FIG. 2, the power supply control system includes a motor (electric device) 12, an inverter (DC-AC converter) 32, a drive unit 4A, and a drive unit 4B. The drive unit 4A includes a fuel cell system 200A, a battery converter 34A, a control unit 33A, an air conditioner 45A, a battery 40A, a current sensor 35A, a current sensor 36A, and a storage unit 150A. The drive unit 4B includes a fuel cell system 200B, a battery converter 34B, a control unit 33B, a DC-DC conversion unit 45B, a battery 40B, a current sensor 35B, and a storage unit 150B.

The motor 12 is, for example, a three-phase AC electric motor. The rotor of the motor 12 is connected to the wheels 5A and 5B which are the driving wheels of FIG. 1. The motor 12 uses at least one of the electric power generated by the fuel cell system 200 and the electric power stored by the battery 40 to output the driving force used for traveling of the electric vehicle 1 to the wheels 5A and 5B. The motor 12 uses the kinetic energy of the vehicle to generate electric power when the vehicle decelerates.

The inverter 32 is, for example, an AC-DC converter. The AC-side terminal of the inverter 32 is connected to the motor 12 and the DC-side terminal is connected to a DC link DL. The inverter 32 converts the DC current input from the DC-side terminal into a three-phase AC current, and supplies the converted three-phase AC current to the motor 12. The inverter 32 is connected to the battery 40A via the DC link DL and the battery converter 34A, and to the battery 40B via the DC link DL and the battery converter 34B. The inverter 32 converts the AC current generated by the motor 12 into a DC current and outputs the same to the DC link DL.

The fuel cell system 200 is an example of a "fuel cell system" and includes a fuel cell (FC) converter 244, a fuel cell 201, and an air pump 202. The FC converter 244 is, for example, a step-up direct current-direct current (DC-DC) converter that boosts the voltage of the fuel cell 201. The fuel cell 201 is, for example, a battery having a configuration in which hydrogen is used as an energy source for electric power generation. The air pump 202 is a compressor 214 used in a fuel cell cooling system 280 that will be described later.

The fuel cell system 200 includes, for example, a fuel cell. A fuel cell generates electric power, for example, when hydrogen contained as a fuel in a fuel gas reacts with oxygen contained as an oxidant in air. The fuel cell system 200 generates an instructed amount of power under the control of the control unit 33, and outputs the generated power to a DC link DL between the inverter 32 and the battery converter 34, for example, to supply power. As a result, the electric power supplied by the fuel cell system 200 is supplied to the motor 12 via the inverter 32 or to the battery 40 via the battery converter 34 under the control of the control unit 33 and the like, and is stored in the battery 40, or is supplied as the power required for other auxiliary equipment. A detailed configuration example of the fuel cell system 200 will be described later.

The battery converter 34A is, for example, a step-up DC-DC converter. The battery converter 34A boosts the DC voltage supplied from the battery 40A and outputs the same to the DC link DL. The battery converter 34A outputs the regenerative voltage supplied from the motor 12 or the FC voltage supplied from the fuel cell system 200A to the battery 40A.

The battery converter 34A performs voltage control so that the DC-side terminal of the inverter 32 has a predetermined voltage (a voltage supplied to the DC-side terminal of the inverter 32 whose DC voltage is boosted).

The battery converter 34B is, for example, a step-up DC-DC converter. The battery converter 34 boosts the DC voltage supplied from the battery 40 and outputs the same to the DC link DL. The battery converter 34B outputs the regenerative voltage supplied from the motor 12 or the FC voltage supplied from the fuel cell system 200B to the battery 40B. The battery converter 34B controls the current so that the current flowing to the DC-side terminal of the inverter 32 has a predetermined current value (the current value of the current supplied to the DC-side terminal of the inverter 32).

The battery 40 is a battery serving as an energy source, and is a battery that can be repeatedly charged and discharged, such as a nickel-hydrogen battery, a lithium ion secondary battery, or a sodium ion battery. The battery 40 stores, for example, the electric power generated by the motor 12 or the fuel cell system 200, and discharges the electric power for the electric vehicle 1 to travel or for operating an in-vehicle device. The battery 40 includes a battery sensor that detects the current value, voltage value, and temperature of the battery 40. The battery 40 may be connected to, for example, an external charging facility to be charged by the electricity supplied from a charging/discharging device.

The air conditioner 45A is a so-called air conditioner that adjusts the temperature and humidity of the air inside the electric vehicle.

The DC-DC conversion unit 45B performs DC-DC conversion. The DC-DC conversion unit 45B converts, for example, the DC voltage of approximately 300 V output by the battery 40 into a DC voltage of 12 V.

The current sensor 35A acquires the current value (first current value) of the current IA (first current) flowing between the battery converter 34A and the battery 40A as an acquired value MIA, and outputs the acquired value MIA to the control unit 33A of the drive unit 4A.

The current sensor 36A acquires the current value (first current value) of the current IA (first current) flowing between the battery converter 34A and the battery 40A as an acquired value MIA, and outputs the acquired value MIA to the control unit 33B of the drive unit 4B.

The current sensors 35A and 36A are, for example, Hall elements, and are the two elements sealed in packages.

The current sensor 35B acquires the current value (second current value) of the current IB (second current) flowing between the battery converter 34B and the battery 40 as an acquired value MIB, and outputs the acquired value MIB to the control unit 33B of the drive unit 4B. The current sensor 35B is, for example, a Hall element, which is one of the two elements sealed in packages.

The current sensors 35A and 36A may not be Hall elements, and may be configured as one sensor in the case of a configuration in which the acquired value is output as a digital value, and may be configured such that the acquired values MIA are collectively output to the control unit 33A of the drive unit 4A and the control unit 33B of the drive unit 4B. Similarly, the current sensor 35B may not be a Hall element, and may be configured as one sensor in the case of a configuration in which the acquired value is output as a digital value, and may be configured such that the acquired value MIB is output to the control unit 33B of the drive unit 4B.

The current sensors 35A and 36A may be configured to estimate and acquire a current value from the relationship between the potential difference between both ends of an electric circuit and the current flowing through the electric circuit using Ohm's law. Similarly, the current sensor 35B may be configured to estimate and acquire a current value from the relationship between the potential difference between both ends of an electric circuit and the current flowing through the electric circuit using Ohm's law.

The data transmission of the acquired value MIA from the current sensor 35A to the control unit 33A and the data transmission of the acquired value MIA from the current sensor 36A to the control unit 33B may be performed wirelessly instead of by wire. Similarly, the data transmission of the acquired value MIB from the current sensor 35B to the control unit 33B and the data transmission of the acquired value MIB from the current sensor 36B to the control unit 33A may be performed wirelessly instead of by wire.

The control unit 33 controls the traveling of the electric vehicle 1 and the operation of the in-vehicle device. For example, the control unit 33 controls the supply of electric power charged in the battery 40 and electric power generated by the fuel cell system 200 according to the electric power required from the electric vehicle 1. The electric power required from the electric vehicle 1 is, for example, the total load electric power required for the load of the electric vehicle 1 to be driven or operated. The load includes, for example, the motor 12, an auxiliary machine such as a brake device (not illustrated), a vehicle sensor, a display device, and other in-vehicle devices. The control unit 33 may perform travel control of the electric vehicle 1 and the like. The details of the function of the control unit 33 will be described later.

The storage unit 150 is realized by a storage medium such as a hard disk drive (HDD), a flash memory, an electrically erasable programmable read only memory (EEPROM), a read only memory (ROM), or a random access memory (RAM). Various pieces of information necessary for power control are stored in the storage unit 150. The various pieces of information necessary for power control will be described later.

[Fuel Cell System]

Figure 3:
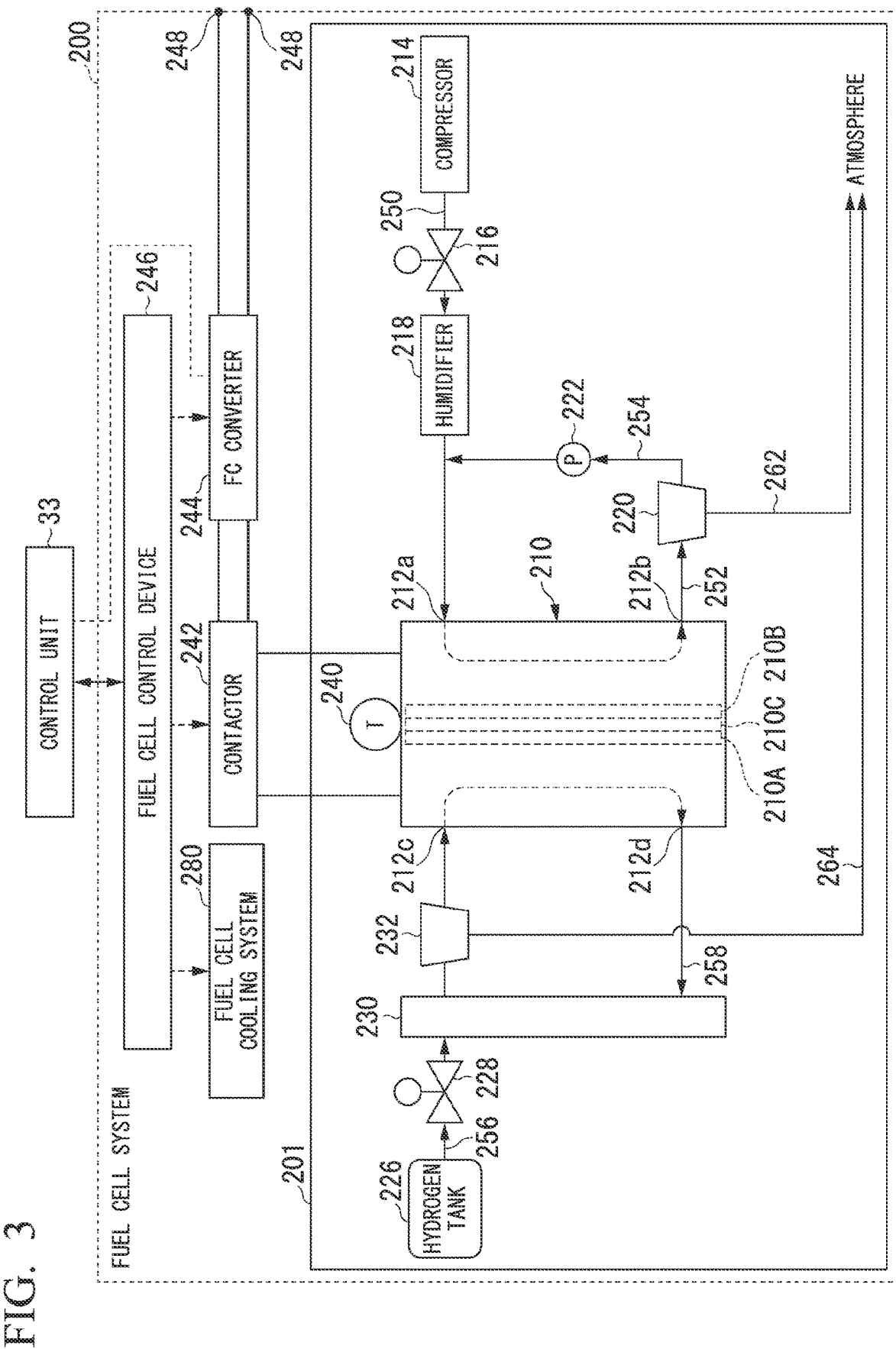
FIG. 3 is a diagram illustrating an example of the configuration of a fuel cell system 200 according to the embodiment.

Here, the fuel cell system 200 will be described in detail. FIG. 3 is a diagram illustrating an example of the configuration of the fuel cell system 200 according to the embodiment. The configuration illustrated in FIG. 3 is applicable to each of the plurality of fuel cell systems 200 mounted on the electric vehicle 1. The fuel cell system 200 according to the present embodiment is not limited to the following configuration, and may have any configuration as long as it has a system configuration that generates electric power by, for example, an anode and a cathode. The fuel cell system 200 illustrated in FIG. 3 includes, for example, an FC stack 210, a compressor 214, a sealing inlet valve 216, a humidifier 218, a gas-liquid separator 220, an exhaust gas circulation pump (P) 222, a hydrogen tank 226, a hydrogen supply valve 228, a hydrogen circulation unit 230, a gas-liquid separator 232, a temperature sensor (T) 240, a contactor 242, an FC converter 244, an FC control device 246, and an FC cooling system 280.

The FC stack 210 includes a laminate (not illustrated) in which a plurality of fuel cells are laminated, and a pair of end plates (not illustrated) that sandwich the laminate from both sides in the stacking direction. The fuel cell includes a membrane electrode assembly (MEA) and a pair of separators that sandwich the membrane electrode assembly from both sides in the bonding direction. The membrane electrode assembly includes, for example, an anode 210A composed of an anode catalyst and a gas diffusion layer, a cathode 210B composed of a cathode catalyst and a gas diffusion layer, and a solid polymer electrolyte membrane 210C sandwiched between the anode 210A and the cathode 210B from both sides in the thickness direction and made of a cation exchange membrane or the like.

A fuel gas containing hydrogen as a fuel is supplied from the hydrogen tank 226 to the anode 210A. Air, which is an oxidant gas (reaction gas) containing oxygen as an oxidant, is supplied from the compressor 214 to the cathode 210B. The hydrogen supplied to the anode 210A is ionized by a catalytic reaction on the anode catalyst, and the hydrogen ions move to the cathode 210B via the appropriately humidified solid polymer electrolyte membrane 210C. The electrons generated by the movement of hydrogen ions can be taken out to an external circuit (FC converter 244 or the like) as a DC current. The hydrogen ions that have moved from the anode 210A onto the cathode catalyst of the cathode 210B react with the oxygen supplied to the cathode 210B and the electrons on the cathode catalyst to generate water.

The compressor 214 includes a motor or the like that is driven and controlled by the FC control device 246, and takes in air from the outside and compresses the air using the driving force of the motor, and pumps oxidizing gas to the fuel cell by sending the compressed air to the oxidant gas supply path 250 connected to the cathode 210B.

The sealing inlet valve 216 is provided in the oxidant gas supply path 250 connecting the compressor 214 and a cathode supply port 212a capable of supplying air to the cathode 210B of the FC stack 210, and is opened and closed under the control of the FC control device 246.

The humidifier 218 humidifies the air sent from the compressor 214 to the oxidant gas supply path 250. For example, the humidifier 218 is provided with a water permeable membrane such as a hollow fiber membrane, and brings the air from the compressor 214 into contact with the air through the water permeable membrane to add water to the air to humidify the air.

The gas-liquid separator 220 discharges the cathode exhaust gas and the liquid water discharged from the cathode discharge port 212b without being consumed by the cathode 210B to the oxidant gas discharge path 252 to the atmosphere through the cathode exhaust path 262. The gas-liquid separator 220 may separate the cathode exhaust gas and the liquid water discharged to the oxidant gas discharge path 252, and may allow only the separated cathode exhaust gas to flow into the exhaust gas recirculation path 254.

The exhaust recirculation pump 222 is provided in the exhaust recirculation path 254, and mixes the cathode exhaust gas that has flowed from the gas-liquid separator 220 into the exhaust recirculation path 254 with the air flowing from the sealing inlet valve 216 toward the cathode supply port 212a through the oxidant gas supply path 250 and supplies the mixture to the cathode 210B again.

The hydrogen tank 226 stores hydrogen in a compressed state. The hydrogen supply valve 228 is provided in the fuel gas supply path 256 connecting the hydrogen tank 226 and an anode supply port 212c capable of supplying hydrogen to the anode 210A of the FC stack 210. When the hydrogen supply valve 228 is opened under the control of the FC control device 246, the hydrogen stored in the hydrogen tank 226 is supplied to the fuel gas supply path 256.

The hydrogen circulation unit 230 is, for example, a pump that circulates and supplies fuel gas to a fuel cell. For example, the hydrogen circulation unit 230 circulates the anode exhaust gas discharged from the anode discharge port 212d to the fuel gas discharge path 258 without being consumed by the anode 210A to the fuel gas supply path 256 through which fuel gas flows into the gas-liquid separator 232.

The gas-liquid separator 232 separates the anodic exhaust gas and the liquid water that circulate from the fuel gas discharge path 258 to the fuel gas supply path 256 by the action of the hydrogen circulation unit 230. The gas-liquid separator 232 supplies the anode exhaust gas separated from the liquid water to the anode supply port 212c of the FC stack 210. The liquid water discharged to the gas-liquid separator 232 is discharged into the atmosphere through the drain pipe 264.

The temperature sensor 240 detects the temperatures of the anode 210A and the cathode 210B of the FC stack 210, and outputs a detection signal (temperature information) to the FC control device 246.

The contactor 242 is provided between the anode 210A and the cathode 210B of the FC stack 210 and the FC converter 244. The contactor 242 electrically connects or disconnects the FC stack 210 and the FC converter 244 on the basis of the control from the FC control device 246.

The FC converter 244 is, for example, a step-up DC-DC converter. The FC converter 244 is arranged between the anode 210A and the cathode 210B of the FC stack 210 and the electrical load via the contactor 242. The FC converter 244 boosts the voltage of the output terminal 248 connected to the electric load side to a target voltage determined by the FC control device 246. The FC converter 244 boosts the voltage output from the FC stack 210 to a target voltage and outputs the voltage to the output terminal 248, for example. The output terminal 248 is connected to the DC-side terminal of the inverter 32, which will be described later.

The FC control device 246 controls the start and end of power generation in the fuel cell system 200, the amount of power generation, and the like according to the control unit 33. The FC control device 246 controls the temperature adjustment of the fuel cell system 200 using the FC cooling system 280. The FC control device 246 may be replaced with a control device such as the control unit 33. Further, the FC control device 246 may perform power supply control of the electric vehicle 1 in cooperation with the control unit 33 and the control device 80.

The FC cooling system 280 cools the fuel cell system 200 according to the control of the FC control device 246, for example, when the temperature of the FC stack 210 detected by the temperature sensor 240 is equal to or higher than a threshold value. For example, the FC cooling system 280 cools the temperature of the FC stack 210 by circulating a refrigerant in a flow path provided in the FC stack 210 using a circulation pump (not illustrated) and discharging the heat of the FC stack 210. The FC cooling system 280 may perform control of heating or cooling the FC stack 210 so that the temperature detected by the temperature sensor 240 is maintained within a predetermined temperature range when the fuel cell system 200 is generating power.

[Control Unit]

Figure 4:
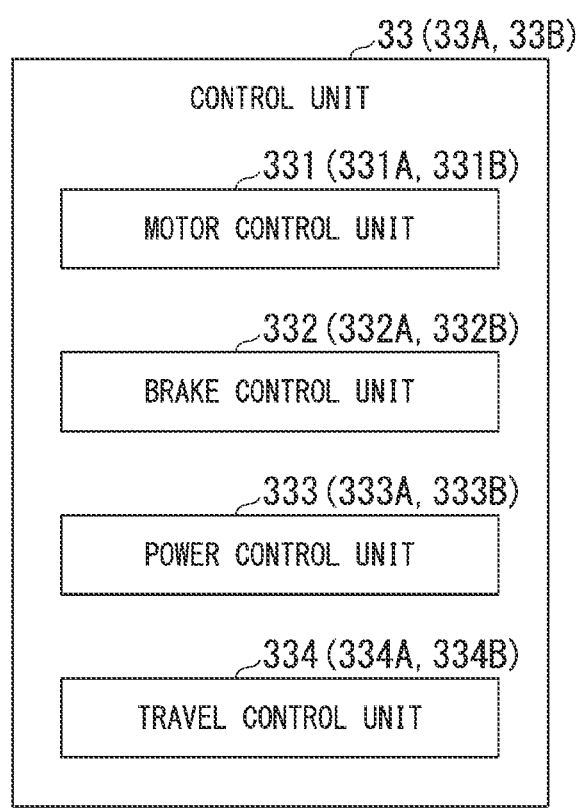
FIG. 4 is a diagram illustrating an example of the configuration of a control unit 33 according to a first embodiment.

FIG. 4 is a diagram illustrating an example of the configuration of the control unit 33 according to the first embodiment. The control unit 33 includes, for example, a motor control unit 331, a brake control unit 332, a power control unit 333, and a travel control unit 334. The motor control unit 331, the brake control unit 332, the power control unit 333, and the travel control unit 334 are each realized by a hardware processor such as a central processing unit (CPU) executing a program (software). Some or all of these components may be realized by hardware (including circuits) such as large scale integration (LSI), an application specific integrated circuit (ASIC), a field-programmable gate array (FPGA), a graphics processing unit (GPU), and the like, or may be realized by software and hardware in cooperation. The program may be stored in advance in a storage device (a storage device including a non-transitory storage medium) such as an HDD or a flash memory of the electric vehicle 1, or may be stored in a removable storage medium such as a DVD or a CD-ROM and be installed in the HDD or the flash memory of the electric vehicle 1 when the storage medium (a non-transitory storage medium) is attached to a drive device. The storage device described above is, for example, the storage unit 150.

The motor control unit 331 calculates the driving force required for the motor 12 on the basis of the output of a vehicle sensor (not illustrated), and controls the motor 12 to output the calculated driving force.

The brake control unit 332 calculates the braking force required for a brake device (not illustrated) which is an auxiliary machine on the basis of the output of the vehicle sensor, and controls the brake device to output the calculated braking force.

The power control unit 333 calculates the required electric energy required for the battery 40 and the fuel cell system 200 on the basis of the output of the vehicle sensor. For example, the power control unit 333 calculates the torque to be output by the motor 12 on the basis of the accelerator opening and the vehicle speed, and sums the drive shaft load power obtained from the torque and the rotation speed of the motor 12 and the electric power required by the auxiliary machine or the like to calculate the required electric energy. The power control unit 333 manages the charging status (storage status) of the battery 40. For example, the power control unit 333 calculates the state of charge (SOC) (battery charge rate) of the battery 40 on the basis of the output of a battery sensor included in the battery 40. For example, when the SOC of the battery 40 is less than a predetermined value, the power control unit 333 executes control for charging the battery 40 by the power generation of the fuel cell system 200. The power control unit 333 may stop the charge control when the SOC of the battery 40 is larger than the predetermined value, or may perform control for allowing the surplus power generated by the fuel cell system 200 to be consumed by an auxiliary machine or the like.

Here, a power control unit 333A in the drive unit 4A determines whether the acquired value MIA (first current value) supplied from the current sensor 35A of the drive unit 4A exceeds the discharge current value DA as a preset threshold value when a discharge current (current having a positive polarity in the present embodiment) is flowing from the battery 40A to the battery converter 34A. The power control unit 333B determines whether the acquired value MIB (second current) supplied from the current sensor 35B of the drive unit 4B exceeds the discharge current value DB as a preset threshold value when the discharge current (current having the positive polarity in the present embodiment) is flowing from the battery 40B to the battery converter 34B. As described above, the battery converter 34B in the drive unit 4B supplies DC power to the DC-side terminal of the inverter 32 by the same current control as the fuel cell system 200B. Therefore, the power control unit 333B always refers to the acquired value MIA supplied from the current sensor 36A in the drive unit 4A, and sets the referenced acquired value MIA as the target current value of the battery converter 34B (changes the control target setting value). That is, the battery converter 34B reflects the acquired value MIA, which is the current value of the current IA flowing through the battery converter 34A in the drive unit 4A in the current value (second current value) of the current IB in real-time.

Figure 5:
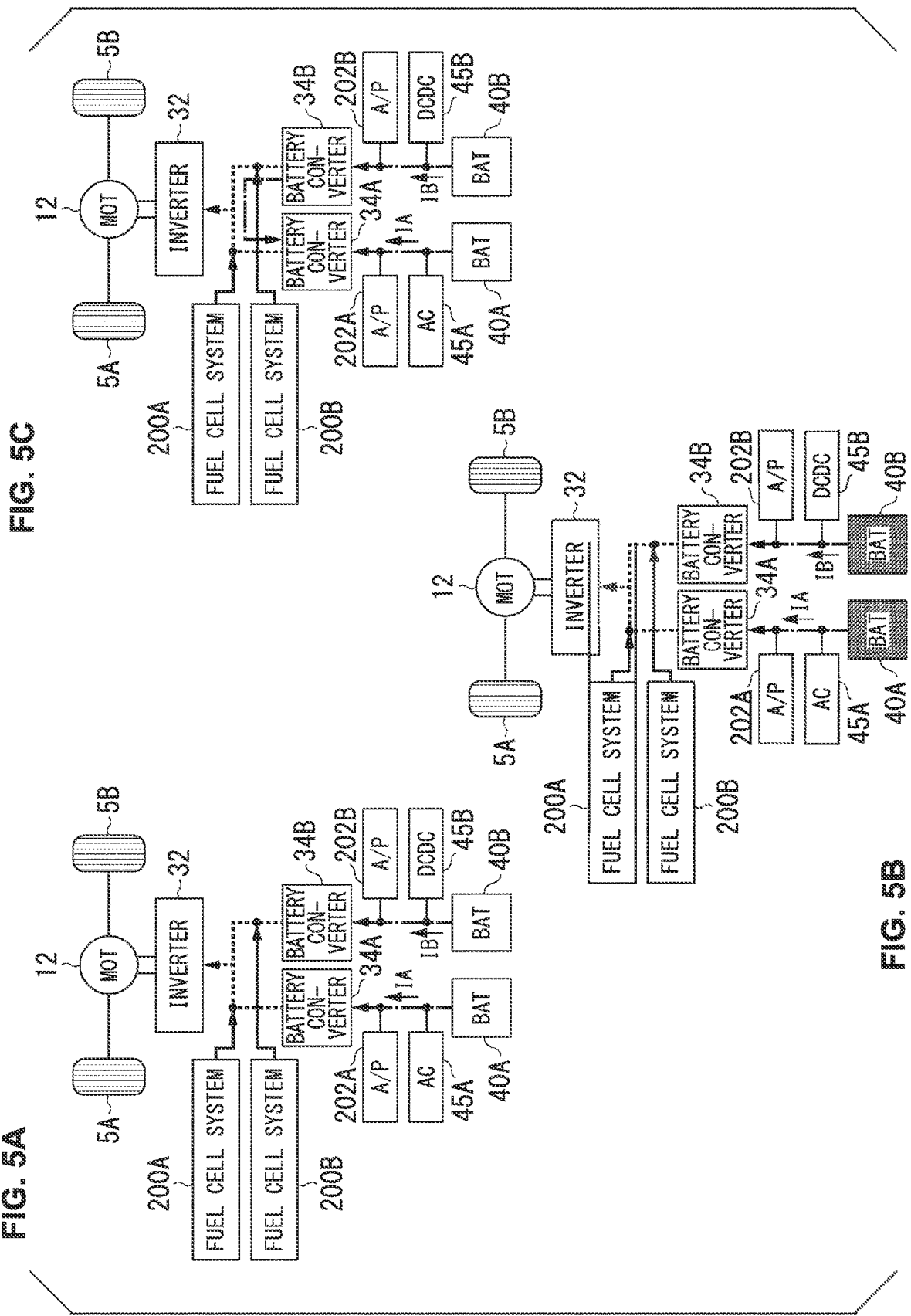
FIGS. 5A to 5C are conceptual diagrams illustrating an operation when a discharge current is flowing out from a battery 40.

FIGS. 5A to 5C are conceptual diagrams illustrating an operation when a discharge current is flowing out from the battery 40. In FIGS. 5A to 5C, the thickness of the line is illustrated in proportion to the amount of current.

In FIG. 5A, the power control unit 333A supplies a required electric energy for the motor 12 to obtain the required torque to the battery converter 34A and the fuel cell system 200A (the FC converter 244A) on the basis of the output of the vehicle sensor. The power control unit 333B supplies the required electric energy for the motor 12 to obtain the required torque to the battery converter 34B and the fuel cell system 200B (the FC converter 244B) on the basis of the output of the vehicle sensor. As a result, the inverter 32 allows the motor 12 to be driven with a predetermined torque by the DC power obtained by summing the DC power supplied from the fuel cell system 200A and the battery 40A in the drive unit 4A and the DC power supplied from the fuel cell system 200B and the battery 40B in the drive unit 4B.

In FIG. 5B, for example, when the driving force of an automobile exceeds the frictional force of a tire and a wheel spin occurs, the rotation speed of the motor 12 increases rapidly, and the power consumption of the motor 12 increases rapidly. At this time, the power control unit 333A and the power control unit 333B instruct the fuel cell system 200A and the fuel cell system 200B, respectively, to supply a predetermined DC power. Therefore, the fuel cell system 200A supplies the instructed current value to the inverter 32A, and the fuel cell system 200B supplies the instructed current value to the inverter 32B.

However, since the power consumption rises rapidly, the voltage of the DC-side terminal of the inverter 32A drops, and the battery converter 34A rapidly increases the discharge current from the battery 40 in order to maintain the command voltage received from the power control unit 333A. Similarly, since the voltage of the DC-side terminal of the inverter 32B drops, the battery converter 34B rapidly increases the discharge current from the battery 40 in order to maintain the command voltage received from the power control unit 333B. As a result, the currents IA and IB, which are the discharge currents from the battery 40, increase, and the battery 40 enters an over-discharged state when this state continues.

In FIG. 5C, the power control unit 333A reads the discharge current value DA, which is a preset threshold value of the discharge current, from the storage unit 150A. Then, the power control unit 333A compares the read discharge current value DA with the acquired value MIA (first current value) of the current IA supplied from the current sensor 35A. At this time, when the acquired value MIA is equal to or less than the discharge current value DA, the power control unit 333A determines that there is no rapid increase in the discharge current, and does not perform a process for suppressing over-discharge. On the other hand, when the acquired value MIA exceeds the discharge current value DA, the power control unit 333A reduces the torque to be output by the motor 12 to a predetermined limit torque, assuming that a rapid increase in the discharge current has occurred. That is, the power control unit 333A reads the adjustment voltage value, which is stored in correspondence with the discharge current value DA and is the required electric energy corresponding to the limit torque, from the storage unit 150A, and outputs the adjustment voltage value to the battery converter 34A as a command value. As a result, the battery converter 34A reduces the current IA from the battery 40A since the voltage value maintained in the DC-side terminal of the inverter 32A decreases. The power control unit 333A reads the adjustment current value when limiting the torque to the limit torque from the storage unit 150A, and outputs a command to the fuel cell system 200A so as to use the read adjustment current value. At this time, the power control unit 333A reads the adjustment value for limiting the limit torque from the storage unit 150A, and outputs the adjustment value as the limit torque to the inverter 32A as a command.

Similarly, the power control unit 333B reads the discharge current value DB, which is a preset threshold value of the discharge current, from the storage unit 150B. Then, the power control unit 333B compares the read discharge current value DB with the acquired value MIB (second current value) of the current IB supplied from the current sensor 35B. At this time, when the acquired value MIB is equal to or less than the discharge current value DB, the power control unit 333B determines that there is no rapid increase in the discharge current, and does not perform a process for suppressing over-discharge. On the other hand, when the acquired value MIB exceeds the discharge current value DB, the power control unit 333B changes the target value of the current value output by the battery converter 34B, assuming that a rapid increase in the discharge current has occurred. At this time, the power control unit 333B reads the acquired value MIA supplied from the current sensor 36 of the drive unit 4A, and changes the target value to the acquired value MIA. As a result, the battery converter 34B decreases the current IB from the battery 40B in correspondence with (in response to) the change in the current value of the current IA since the target value of the current value supplied to the DC-side terminal of the inverter 32 is changed to the current IA lowered by the power control unit 333A. The power control unit 333B reads the adjustment current value when limiting the torque to the limit torque from the storage unit 150B, and outputs a command to the fuel cell system 200B so as to use the read adjustment current value.

Here, since the battery converter 34B uses current limit control, the battery converter 34B continues to output the DC current of a preset current value to the DC-side terminal of the inverter 32 in order to output the DC current of a set current value when the torque of the inverter 32 is reduced. On the other hand, since the battery converter 34A uses voltage control, when the torque of the inverter 32 is reduced, the current for maintaining the voltage is reduced. Therefore, the DC current output from the battery converter 34B is supplied to the battery 40A via the battery converter 34A as a charge current. In order to prevent this, the power control unit 333B changes the acquired value MIA acquired by the current sensor 36A of the drive unit 4A as a new target value of the DC current output by the battery converter 34B. As a result, when the power control unit 333A reduces the torque of the inverter 32, since the current value of the DC current output by the battery converter 34B becomes equal to the DC current output by the battery converter 34B, the DC current output from the battery converter 34B is not supplied to the battery 40A via the battery converter 34A as a charge current.

In the above-described configuration, the discharge current values DA and DB have the same value.

Although it is described that the torque of the motor 12 is reduced to the limit torque, no torque may be generated in the motor 12 as a state in which the torque is 0, that is, the inverter 32 may be stopped. In this case, the power control unit 333A outputs a command to stop the generation of electric power in the fuel cell system 200A. Similarly, the power control unit 333B performs control to stop the generation of electric power in the fuel cell system 200B.

The power control unit 333A determines whether the acquired value MIA supplied from the current sensor 35A of the drive unit 4A exceeds the charge current value CA as a preset threshold value when a charge current (current having a negative polarity in the present embodiment) is flowing from the battery converter 34A to the battery 40A. The power control unit 333B determines whether the acquired value MIB supplied from the current sensor 35B of the drive unit 4B exceeds the charge current value CB as a preset threshold value when a charge current (current having a negative polarity in the present embodiment) is flowing from the battery converter 34B to the battery 40B.

Figure 6:
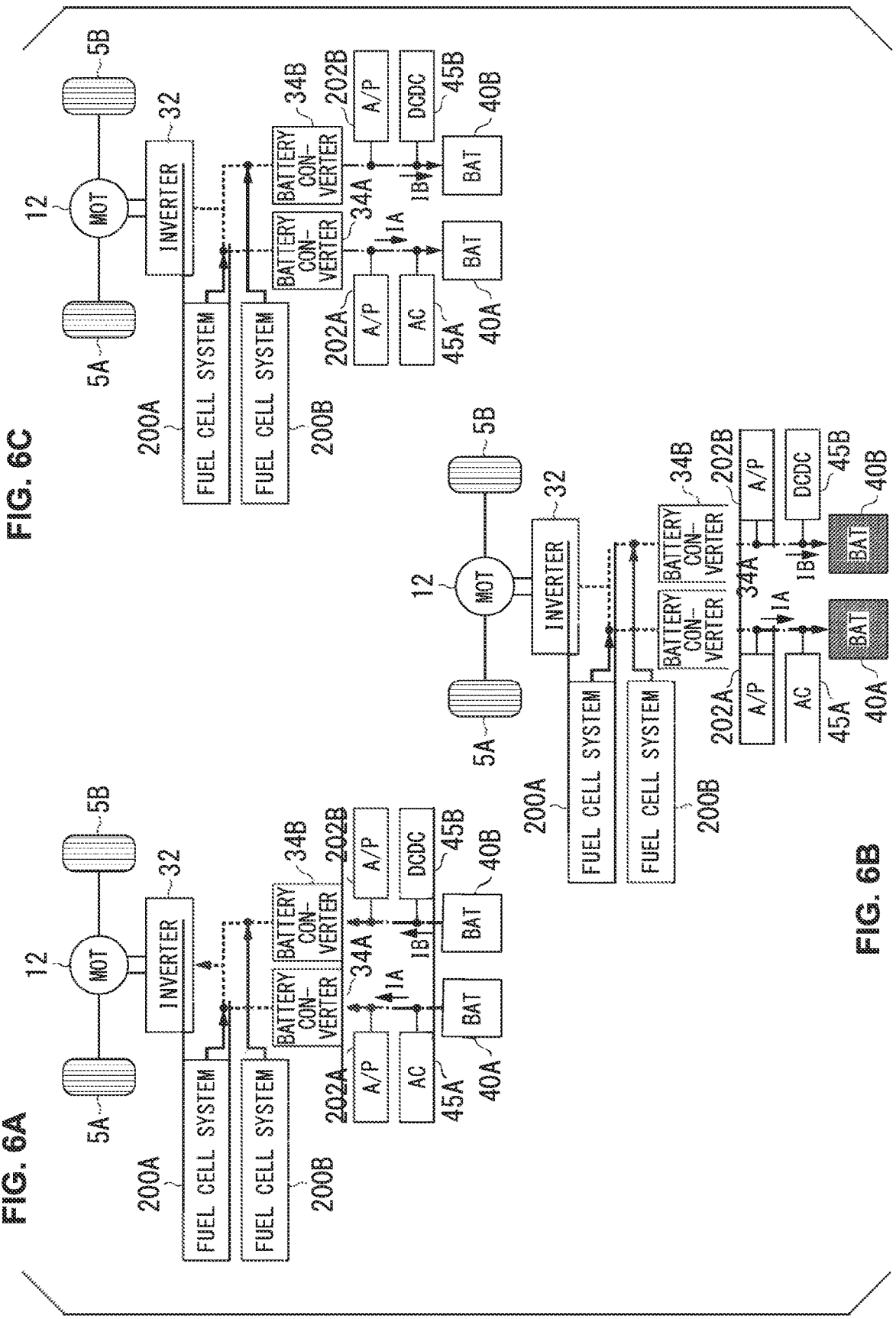
FIGS. 6A to 6C are conceptual diagrams illustrating an operation when a charge current is flowing into the battery 40.

FIGS. 6A to 6C are conceptual diagrams illustrating an operation when a charge current is flowing into the battery 40. In FIGS. 6A to 6C, the thickness of the line is illustrated in proportion to the amount of current.

In FIG. 6A, the power control unit 333A supplies the required electric energy for the motor 12 to obtain the required torque to the battery converter 34A and the fuel cell system 200A on the basis of the output of the vehicle sensor. The power control unit 333B supplies the required electric energy for the motor 12 to obtain the required torque to the battery converter 34B and the fuel cell system 200B on the basis of the output of the vehicle sensor. As a result, the inverter 32 allows the motor 12 to be driven with a predetermined torque by the DC power obtained by summing the DC power supplied from the fuel cell system 200A and the battery 40A in the drive unit 4A and the DC power supplied from the fuel cell system 200B and the battery 40B in the drive unit 4B. In FIG. 6B, for example, when a tire is locked when the brake is applied, the rotation speed of the motor 12 rapidly drops, and the power consumption of the motor 12 decreases rapidly. At this time, the power control unit 333A and the power control unit 333B instruct the fuel cell system 200A and the fuel cell system 200B, respectively, to supply a predetermined DC power. Therefore, the fuel cell systems 200A and 200B cooperate with each other to supply the instructed current value to the inverter 32.

However, although the power consumption of the motor 12 decreases rapidly, the current for supplying the instructed DC current continues to flow from the fuel cell system 200A. As a result, since the voltage of the DC-side terminal of the inverter 32 increases, the current IA as the charge current for the battery 40A increases rapidly so that the battery converter 34A maintains the command voltage received from the power control unit 333A. Similarly, although the power consumption of the motor 12 decreases rapidly, the current for supplying the instructed DC current continues to flow from the fuel cell system 200B. As a result, since the voltage of the DC-side terminal of the inverter 32 increases, the charge current for the battery 40B rapidly increases so that the battery converter 34B maintains the command voltage received from the power control unit 333B. As a result, the batteries 40A and 40B enter an over-charged state since the above-mentioned state continues.

In FIG. 6C, the power control unit 333A reads the charge current value CA, which is a preset threshold value of the charge current, from the storage unit 150A. The power control unit 333A compares the read charge current value CA with the acquired value MIA of the current IA supplied from the current sensor 35A. At this time, when the acquired value MIA is equal to or less than the charge current value CA, the power control unit 333A determines that there is no rapid increase in the charge current, and does not perform a process for suppressing over-charging. On the other hand, when the acquired value MIA exceeds the charge current value CA, the power control unit 333A reduces the charge current to a predetermined limit current value in order to reduce (or stop generation of) the DC power output by the fuel cell system 200A, assuming that a rapid increase in the charge current has occurred. That is, the power control unit 333A reads the adjustment value as the limit current value stored in correspondence with the charge current value CA from the storage unit 150A, and outputs this adjustment value to the fuel cell system 200A as a command value. As a result, the fuel cell system 200A reduces the current IA as the charge current for the battery 40 to a preset target value in order to reduce the current value flowing into the DC-side terminal of the inverter 32A.

Similarly, the power control unit 333B reads the charge current value CB, which is a preset threshold value of the charge current, from the storage unit 150B. The power control unit 333B compares the read charge current value CB with the acquired value MIB of the current IB supplied from the current sensor 35B. At this time, when the acquired value MIB is equal to or less than the charge current value CB, the power control unit 333B determines that there is no rapid increase in the charge current, and does not perform a process for suppressing over-charging. On the other hand, when the acquired value MIB exceeds the charge current value CB, the power control unit 333B reduces the charge current to a predetermined limit current value in order to reduce (or stop generation of) the DC power output by the fuel cell system 200B, assuming that a rapid increase in the charge current has occurred. That is, the power control unit 333B reads the adjustment value as the limit current value stored in correspondence with the charge current value CB from the storage unit 150B, and outputs this adjustment value to the fuel cell system 200B as a command value. As a result, the fuel cell system 200B reduces the current IB as the charge current for the battery 40B to a preset target value in order to reduce the current value flowing into the DC-side terminal of the inverter 32B. In the above-described configuration, the charge current values CA and CB have the same value.

The travel control unit 334 executes driving control of the electric vehicle 1 on the basis of information acquired by, for example, a vehicle sensor (not illustrated). The travel control unit 334 may execute the driving control of the electric vehicle 1 on the basis of the map information and the information acquired from a monitoring unit (not illustrated) in addition to the information acquired by the vehicle sensor. The monitoring unit includes, for example, a camera that images the space outside the electric vehicle 1, a radar or a radar or light detection and ranging (LIDAR) that has a detection range outside the electric vehicle 1, and an object recognition device that performs sensor fusion processing on the basis of the outputs from these devices. The monitoring unit estimates the types of objects (particularly, vehicles, pedestrians, and bicycles) present around the electric vehicle 1, and outputs the information of the position and speed thereof to the travel control unit 334. The driving control is to drive the electric vehicle 1 by controlling one or both of the steering and acceleration/deceleration of the electric vehicle 1, for example. The driving control includes, for example, driving support control such as advanced driver assistance system (ADAS). ADAS includes, for example, lane keeping assistance system (LKAS), adaptive cruise control system (ACC), collision mitigation brake system (CMBS) and the like. Both the travel control units 334A and 334B are provided with the above-mentioned functions, but in the present embodiment, control is performed in such a way that only one of them functions and the other does not function (such as setting an unused flag in program), and processing such as driving control is performed by either of them.

[Power Supply Control Operation]

Figure 7:
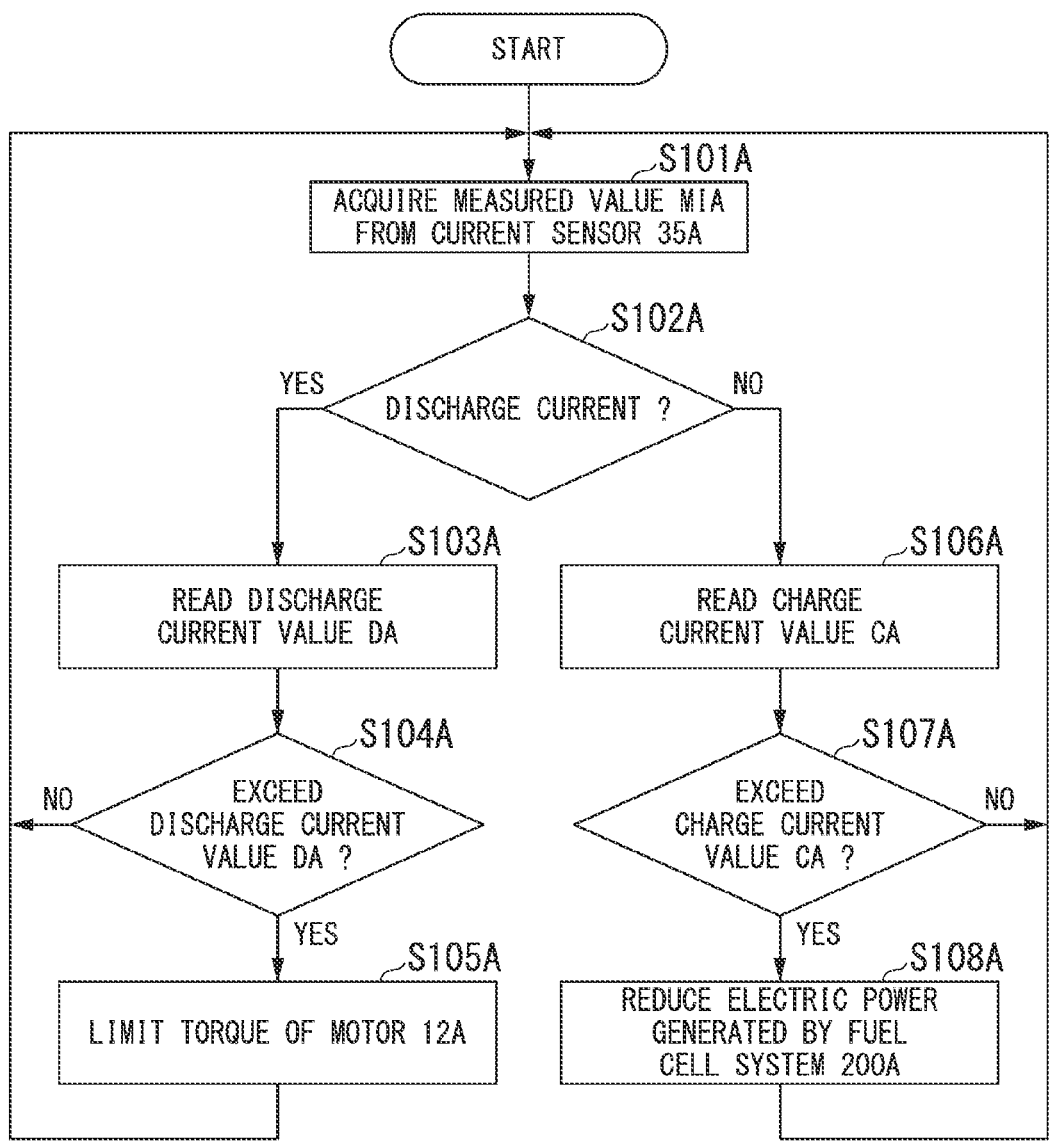
FIG. 7 is a flowchart illustrating an operation example of a power supply control process in a drive unit 4A.

FIG. 7 is a flowchart illustrating an operation example of the power supply control process in the drive unit 4A. The power control unit 333A performs the operation of the flowchart of FIG. 7 after supplying the required electric energy for obtaining the required torque to the battery converter 34A and the fuel cell system 200A on the basis of the output of the vehicle sensor.

The power control unit 333A acquires the acquired value MIA, which is the current value of the current IA, from the current sensor 35A (step S101A). The power control unit 333A determines whether the polarity of the acquired value MIA of the current IA supplied from the current sensor 35A is positive (discharge current from the battery 40A to the battery converter 34A) or negative (charge current from the battery converter 34A to the battery 40A) (step S102A). At this time, the power control unit 333A proceeds to step S103A when the polarity of the acquired value MIA is positive, while the power control unit 333A proceeds to step S106A when the polarity of the acquired value MIA is negative.

Then, the power control unit 333A reads the discharge current value DA set as the threshold value of the discharge current from the storage unit 150A (step S103A). The power control unit 333A compares the acquired value MIA with the read discharge current value DA, and determines whether the acquired value MIA exceeds the discharge current value DA (step S104A). At this time, the power control unit 333A proceeds to step S105A when the acquired value MIA exceeds the discharge current value DA. On the other hand, the power control unit 333A proceeds to step S101A when the acquired value MIA is equal to or less than the discharge current value DA.

Subsequently, the power control unit 333A reads the adjustment voltage value stored in correspondence with the discharge current value DA from the storage unit 150A in order to limit the torque of the motor 12 (process to reduce the DC power consumed by the inverter 32) and outputs a command to change (decrease) the voltage value as the target value for controlling the voltage of the DC-side terminal of the inverter 32 to the battery converter 34A (step S105A). As the voltage value as the target value of the DC-side terminal decreases, the current value of the current IA that the battery converter 34A, which uses the voltage value of the DC-side terminal as a target value, allows to flow out from the battery 40 decreases. The power control unit 333A reads the adjustment value limited to the limit torque from the storage unit 150A, and reduces the torque that the inverter 32 generates with respect to the motor 12 to the limit torque.

The power control unit 333A reads the charge current value CA set as the threshold value of the charge current from the storage unit 150A (step S106A). The power control unit 333A compares the acquired value MIA with the read charge current value CA, and determines whether the acquired value MIA exceeds the charge current value CA (step S107A). At this time, the power control unit 333A proceeds to step S108A when the acquired value MIA exceeds the charge current value CA. On the other hand, the power control unit 333A proceeds to step S101A when the acquired value MIA is equal to or less than the charge current value CA.

Subsequently, the power control unit 333A reads the adjustment voltage value stored in correspondence with the charge current value CA from the storage unit 150A in order to limit the electric energy of the DC power generated by the fuel cell system 200A (process to reduce the electric power generated by the fuel cell system 200A), and outputs a command to change (decrease) the current value of the DC current as the target value for controlling the current to be supplied to the DC-side terminal of the inverter 32A to the fuel cell system 200A (step S108A). As the current value as the target value of the DC-side terminal decreases, the current value of the current IA that flows into the battery 40A via the battery converter 34A as the charge current decreases.

Figure 8:
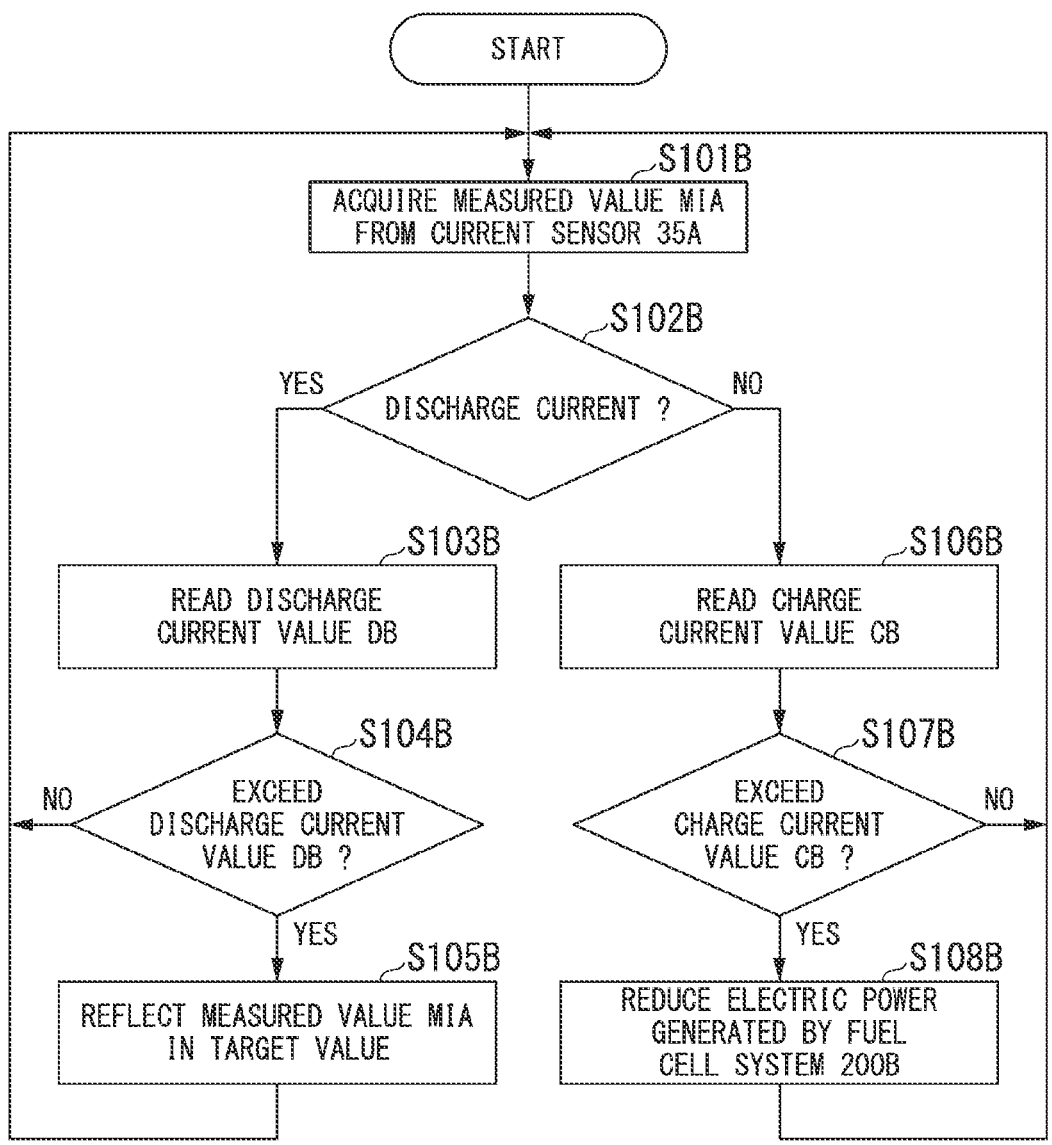
FIG. 8 is a flowchart illustrating an operation example of a power supply control process in a drive unit 4B.

FIG. 8 is a flowchart illustrating an operation example of the power supply control process in the drive unit 4B. The power control unit 333B performs the operation of the flowchart of FIG. 8 after the required electric energy for obtaining the required torque is supplied to the battery converter 34B and the fuel cell system 200B on the basis of the output of the vehicle sensor.

The power control unit 333B acquires the acquired value MIB which is the current value of the current IB from the current sensor 35B (step S101B). The power control unit 333B determines whether the polarity of the acquired value MIB of the current IB supplied from the current sensor 35B is positive (discharge current from the battery 40B to the battery converter 34B) or negative (charge current from the battery converter 34B to the battery 40B) (step S102B). At this time, the power control unit 333B proceeds to step S103B when the polarity of the acquired value MIB is positive, while the power control unit 333B proceeds to step S106B when the polarity of the acquired value MIB is negative.

Then, the power control unit 333B reads the discharge current value DB set as the threshold value of the discharge current from the storage unit 150B (step S103B). The power control unit 333B compares the acquired value MIB with the read discharge current value DB, and determines whether the acquired value MIB exceeds the discharge current value DB (step S104B). At this time, the power control unit 333B proceeds to step S105B when the acquired value MIB exceeds the discharge current value DB. On the other hand, the power control unit 333B proceeds to step S101B when the acquired value MIB is equal to or less than the discharge current value DB.

Subsequently, the power control unit 333B acquires the acquired value MIA of the current IA from the current sensor 36A of the drive unit 4A since limiting (process to reduce the DC power consumed by the inverter 32) of the torque of the motor 12 is performed. Then, the power control unit 333B performs a process of reflecting the acquired value MIA in the current value of the DC current output by the battery converter 34B (step S105B). That is, the power control unit 333B controls the battery converter 34B so as to allow the current value equivalent to the current value that flows out from the battery 40A when the battery converter 34A performs voltage control to flow out from the battery 40B. As a result, the current value of the current IB that is allowed to flow out from the battery 40B by the battery converter 34B decreases, and a portion of the current IB is prevented from flowing back to the battery 40A via the battery converter 34A.

The power control unit 333B reads the charge current value CB set as the threshold value of the charge current from the storage unit 150B (step S106B). The power control unit 333B compares the acquired value MIB with the read charge current value CB, and determines whether the acquired value MIB exceeds the charge current value CB (step S107B). At this time, the power control unit 333B proceeds to step S10BA when the acquired value MIB exceeds the charge current value CB. On the other hand, the power control unit 333B proceeds to step S101B when the acquired value MIB is equal to or less than the charge current value CB.

Subsequently, the power control unit 333B reads the adjustment voltage value stored in correspondence with the discharge current value CB from the storage unit 150B in order to limit the electric energy of the DC power generated by the fuel cell system 200B (process to reduce the electric energy generated by the fuel cell system 200B) and outputs a command to change (decrease) the current value as the DC current as a target value for controlling current to be supplied to the DC-side terminal of the inverter 32 to the fuel cell system 200B (step S108B). As the current value as the target value of the DC-side terminal decreases, the current value of the current IB that flows into the battery 40B as the charge current via the battery converter 34B decreases.

The operation of each step in FIGS. 7 and 8 described above corresponds to the step number and is performed synchronously between the power control units 333A and 333B.

In the process of reducing the charge current to the batteries 40A and 40B when the discharge current from the batteries 40A and 40B rapidly increases due to a tire slip or the like, the fuel cell systems 200A and 200B perform adjustment to reduce the current value output by the battery converters 34A and 34B in parallel in steps S105A and S105B. Therefore, it is possible to prevent the backflow of current from the battery 40B to the battery 40A. In the process of reducing the charge current to the batteries 40A and 40B when the charge current to the batteries 40A and 40B rapidly increases due to a tire lock or the like, the fuel cell systems 200A and 200B reduce the current value of the output DC current in parallel in steps S108A and S108B. Therefore, it is possible to reduce the charge current to the batteries 40A and 40B.

Regarding the acquisition of this synchronization, for example, the drive units 4A and 4B are connected by wire or wirelessly, and one of the drive units 4A and 4B is used as a master control unit and the other is used as a slave control unit. When the master control unit performs the operation of each step, a control signal instructing the slave control unit to perform the operation of the same step is transmitted.

In the power supply control system according to the embodiment described above, the drive units mounted on the electric vehicle 1 (an example of the electric device), each of which is provided with a fuel cell system and a battery and which independently perform the operation of power supply control for the inverter, are operated in parallel, and inverters cooperates to supply DC power for generating a predetermined torque to a motor (electric device). A drive unit that supplies DC power by voltage control and a drive unit that supplies DC power by current control are connected in parallel. The current value of the current flowing by the battery converter that performs the voltage control operation of one drive unit is set as the target value of the battery converter that performs the current control operation of the other unit. Therefore, the same current can be passed through the battery converters operating in parallel, and the phenomenon of backflow of current from one battery to the other battery can be prevented. Moreover, the discharge current and charge current are be decreased to default values between different drive units, the deterioration of functions can be reduced by protecting the battery, and the system efficiency (power generation efficiency, power supply efficiency, and the like) of the fuel cell system can be improved further.

In the present embodiment, a configuration in which the power control unit 333 of the control unit 33 performs the power supply control for the FC converter 244 via the fuel cell control device 246 when the discharge current and charge current have increased has been described. However, in order to perform control to stop or reduce the generation of DC power to the FC converter 244, that is, to stop or reduce the supply of DC power to the DC-side terminal of the inverter 32 at higher speed, the power control unit 333 may directly control the FC converter 244.

Further, the function of the power control unit 333 that controls the power supply of DC power from the FC converter 244 to the DC terminal side of the inverter 32 when the discharge current and the charge current of the battery converter 34 described above increase may be provided to the FC converters 244. In this case, the outputs of the current sensors 35 are directly connected to the FC converters 244.

In the present embodiment, it has been described that the power control unit 333 of the control unit 33 performs the power supply control operation when the discharge current and the charge current increase. However, the power control unit 333 may be provided in the fuel cell control device 246 of the FC converter 244 and the controller or the like of the battery converter 34.

Second Embodiment

Figure 9:
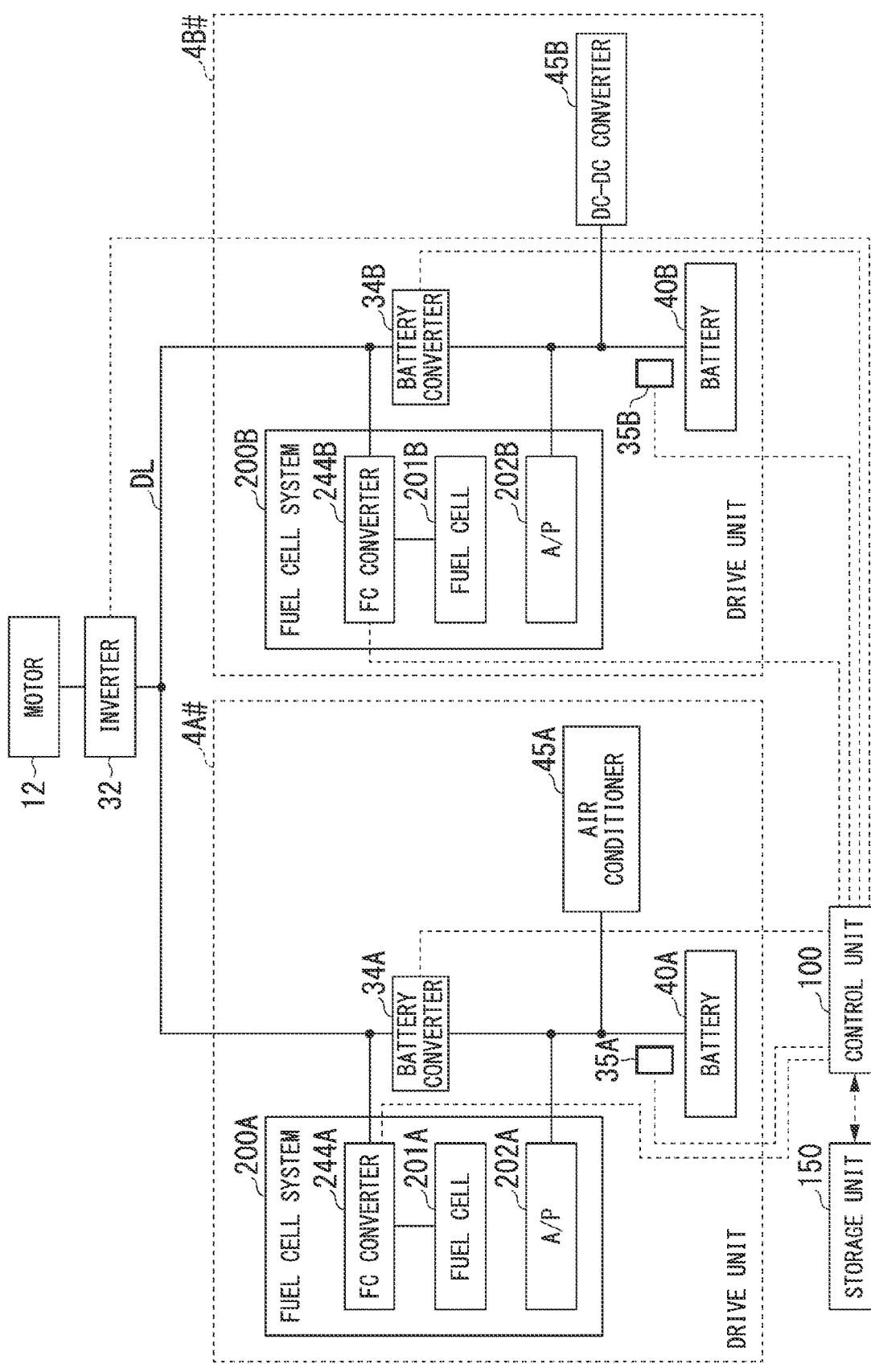
FIG. 9 is a block diagram illustrating an example of a configuration of a power supply control system including a drive unit 4 # according to a second embodiment.

Next, a configuration example of drive units 4A # and 4B # according to a second embodiment will be described. FIG. 9 is a block diagram illustrating an example of the configuration of a power supply control system including the drive unit 4 # according to the second embodiment. As illustrated in FIG. 9, the power supply control system includes a drive unit 4A #, a drive unit 4B #, a motor 12, an inverter 32, a control unit 100, and a storage unit 150. The drive unit 4A # includes a fuel cell system 200A, a battery converter 34A, an air conditioner 45A, and a current sensor 35A. The drive unit 4B # includes a fuel cell system 200B, a battery converter 34B, a DC-DC conversion unit 45B, and a current sensor 35B. In the following description, when the drive units 4A # and 4B # are not distinguished from each other, they will be described as the drive unit 4 # without adding A or B.

Hereinafter, configurations and operations of the second embodiment different from those of the first embodiment will be described. The control units 33 are independently provided in the drive units 4A and 4B in the first embodiment, whereas the control units are integrated as the control unit 100 in the second embodiment and are commonly connected to the drive units 4A # and 4B #.

Figure 10:
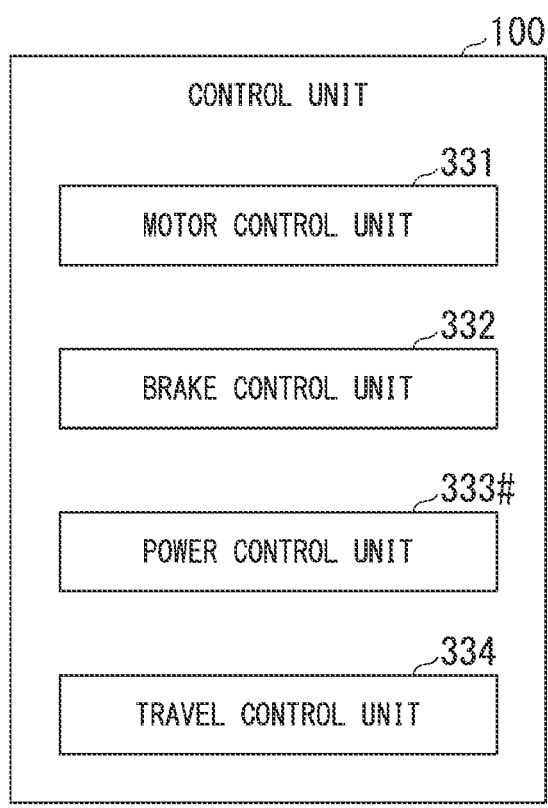
FIG. 10 is a diagram illustrating an example of the configuration of a control unit 100 according to the second embodiment.

FIG. 10 is a diagram illustrating an example of the configuration of the control unit 100 according to the second embodiment. The control unit 100 includes, for example, a motor control unit 331, a brake control unit 332, a power control unit 333 #, and a travel control unit 334. The motor control unit 331, the brake control unit 332, the power control unit 333 #, and the travel control unit 334 are each realized by a hardware processor such as a CPU executing a program. Some or all of these components may be realized by hardware such as LSI, ASIC, FPGA, GPU, or may be realized by collaboration of software and hardware. The program may be stored in advance in a storage device (a storage device including a non-transitory storage medium) such as an HDD or a flash memory of the electric vehicle 1, or may be stored in a removable storage medium such as a DVD or a CD-ROM and be installed in the HDD or the flash memory of the electric vehicle 1 when the storage medium (a non-transitory storage medium) is attached to a drive device. The storage device described above is, for example, the storage unit 150.

Since the motor control unit 331, the brake control unit 332, and the travel control unit 334 in the control unit 100 are the same as the brake control unit 332 and the travel control unit 334 in the control unit 33 according to the first embodiment illustrated in FIG. 4, they are the same, the operation of the power control unit 333 # will be described below.

When a discharge current (current having a positive polarity in the present embodiment) is flowing from the battery 40A, the power control unit 333 # determines whether an acquisition value (current value) MIA supplied from the current sensor 35A of the drive unit 4A # exceeds the discharge current value D as a preset threshold value. Similarly, when a discharge current (current having a positive polarity in the present embodiment) is flowing from the battery 40B, the power control unit 333 # determines whether an acquisition value (current value) MIB supplied from the current sensor 35B of the drive unit 4B # exceeds the discharge current value D as a preset threshold value. When a charge current (current having a negative polarity in the present embodiment) is flowing to the battery 40A, the power control unit 333 # determines whether the acquired value MIA supplied from the current sensor 35A of the drive unit 4A # exceeds the charge current value C as a preset threshold value. Similarly, when the charge current (current having a negative polarity in the present embodiment) is flowing to the battery 40B, the power control unit 333 # determines whether the acquired value MIB supplied from the current sensor 35B of the drive unit 4B # exceeds the charge current value C as a preset threshold value.

The operation when the power control unit 333 # performs the control in FIGS. 5A to 5C will be described below.

In FIG. 5A, the power control unit 333 # supplies the required electric energy for obtaining the required torque to the battery converters 34A and 34B and the fuel cell systems 200A and 200B on the basis of the output of the vehicle sensor. As a result, the inverter 32 allows the motor 12 to be driven with a predetermined torque by the DC power supplied to the DC-side terminal, obtained by summing the DC power supplied from the fuel cell systems 200A and 200B and the DC power supplied from the batteries 40A and 40B for adjusting the shortage.

In FIG. 5B, for example, when the driving force of an automobile exceeds the frictional force of a tire and a wheel spin occurs, the rotation speed of the motor 12 increases rapidly, and the power consumption of the motor 12 increases rapidly. At this time, the power control unit 333 # instructs the fuel cell systems 200A and 200B to supply a predetermined DC power. Therefore, the fuel cell systems 200A and 200B supply the instructed current value to the inverter 32. The power control unit 333 # sets a target value for controlling the voltage of the DC-side terminal of the inverter 32 for the battery converter 34A, and sets the acquired value MIA of the current sensor 35A for the battery converter 34A in real-time to the setting value for controlling the DC current to be supplied to the DC-side terminal of the inverter 32.

However, since the power consumption rises rapidly, the voltage of the DC-side terminal of the inverter 32 drops, and the battery converter 34A rapidly increases the discharge current from the battery 40A (that is, the current value of the current IA) in order to maintain the command voltage received from the power control unit 333 #. Similarly, since the power control unit 333 # sets the acquired value MIA of the current IA as the target value of the current control of the battery converter 34B, the battery converter 34B rapidly increases the discharge current from the battery 40B (that is, the current value of the current IB) in order to allow the current IB of the command current value to flow. As a result, the current IA, which is the discharge current from the battery 40A, increases, and the battery 40A enters an over-discharged state when this state continues. Similarly, since the current IB, which is the discharge current from the battery 40B, increases, the battery 40B enters an over-discharged state when this state continues.

In FIG. 5C, the power control unit 333 # reads the discharge current value D, which is a preset threshold value of the discharge current, from the storage unit 150. Then, the power control unit 333 # compares the acquired value MIA of the current IA supplied from the current sensor 35A with the read discharge current value D. At this time, when the acquired value MIA is equal to or less than the discharge current value D, the power control unit 333 # determines that there is no rapid increase in the discharge current, and does not perform a process for suppressing over-discharge. On the other hand, when the acquired value MIA exceeds the discharge current value D, the power control unit 333 # reduces the torque to be output by the motor 12 to a predetermined limit torque, assuming that a rapid increase in the discharge current has occurred. That is, at this time, the power control unit 333 # reads the adjustment value for limiting the limit torque from the storage unit 150, outputs the adjustment value as the limit torque to the inverter 32 as a command, and reduces the torque that the inverter 32 generates for the motor 12 to the limit torque. At this time, the power control unit 333 # reads the adjustment voltage value, which is stored in correspondence with the discharge current value D and is the required electric energy corresponding to the limit torque, from the storage unit 150, and outputs the adjustment voltage value to the battery converter 34A as a command value. As a result, the battery converter 34A reduces the current IA from the battery 40A because the voltage value maintained in the DC-side terminal of the inverter 32 decreases (or the amount of current for maintaining the voltage value decreases). The power control unit 333 # sets the acquired value MIA of the current sensor 35A of the drive unit 4A # as the target value of the current control of the battery converter 34B. As a result, the battery converter 34 reduces the current IB from the battery 40B similarly to the current IA from the battery 40A.

The operation when the power control unit 333 # performs the control in FIGS. 6A to 6C will be described below.

In FIG. 6A, the power control unit 333 # supplies the required electric energy for obtaining the required torque to the battery converters 34A and 34B and the fuel cell systems 200A and 200B on the basis of the output of the vehicle sensor. As a result, the inverter 32 allows the motor 12 to be driven with a predetermined torque by the DC power supplied to the DC-side terminal, obtained by summing the DC power supplied from the fuel cell systems 200A and 200B and the DC power supplied from the batteries 40A and 40B for adjusting the shortage.

In FIG. 6B, for example, when a tire is locked when the brake is applied, the rotation speed of the motor 12 rapidly drops, and the power consumption of the motor 12 decreases rapidly. At this time, the power control unit 333 # instructs the fuel cell systems 200A and 200B to supply a predetermined DC power. Therefore, the fuel cell system 200A and the fuel cell system 200B supply the instructed current value to the DC-side terminal of the inverter 32.

Therefore, although the power consumption of the motor 12 decreases rapidly, the fuel cell systems 200A and 200B continue to supply the instructed DC current. As a result, the voltage of the DC-side terminal of the inverter 32 rapidly increases. Therefore, the backflow current from the DC-side terminal side of the inverter 32 to the battery 40A via the battery converter 34A rapidly increases. Similarly, the backflow current from the DC-side terminal side of the inverter 32 to the battery 40B via the battery converter 34B rapidly increases. As a result, the current IA, which is the charge current for the battery 40A, increases, and the battery 40A enters an over-charged state when this state continues. Since the current IB, which is the charge current for the battery 40B, increases, the battery 40B enters an over-charged state when this state continues.

In FIG. 6C, the power control unit 333 # reads the charge current value C, which is a preset threshold value of the charge current, from the storage unit 150. The power control unit 333 # compares the read charge current value C with the acquired value MIA of the current IA supplied from the current sensor 35A. At this time, when the acquired value MIA is equal to or less than the charge current value C, the power control unit 333 # determines that there is no rapid increase in the charge current, and does not perform a process for suppressing over-charging. On the other hand, when the acquired value MIA exceeds the charge current value C, the power control unit 333 # reduces the charge current to a predetermined limit current value in order to reduce the DC power output by the fuel cell system 200A (including stopping generation of power) assuming that a rapid increase in the charge current has occurred. Then, the fuel cell system 200A reduces the current IA as the charge current for the battery 40A to a preset target value in order to reduce the current value flowing into the DC-side terminal of the inverter 32. Similarly, the power control unit 333 # compares the read charge current value C with the acquired value MIB of the current IB supplied from the current sensor 35B. At this time, when the acquired value MIB is equal to or less than the charge current value C, the power control unit 333 # determines that there is no rapid increase in the charge current, and does not perform a process for suppressing over-charging. On the other hand, when the acquired value MIB exceeds the charge current value C, the power control unit 333 # reduces the charge current to a predetermined limit current value in order to reduce (including stopping power generation) the DC power output by the fuel cell system 200B. Then, the fuel cell system 200B reduces the current IB as the charge current for the battery 40B to a preset target value in order to reduce the current value flowing into the DC-side terminal of the inverter 32.

Although it has been described that the torque of the motor 12 is reduced to the limit torque, no torque may be generated in the motor 12 (that is, the inverter 32 may be stopped) as a state in which the torque is 0. In this case, the power control unit 333 # outputs a command to stop the generation of electric power in the fuel cell systems 200A and 200B.

In the above-described configuration, a configuration in which the power control unit 333 # of the control unit 100 performs power supply control for of the fuel cell system 200 via the fuel cell control device 246 when the discharge current and the charge current have increased has been described. However, in order to perform control to stop or reduce the generation of DC power to the FC converter 244, that is, to stop or reduce the supply of DC power to the DC-side terminal of the inverter 32 at higher speed, the power control unit 333 # may directly control the FC converter 244.

Further, the function of the power control unit 333 # that controls the power supply of DC power from the FC converter 244 to the DC terminal side of the inverter 32 when the discharge current and the charge current of the battery converter 34 described above increase may be provided to the FC converters 244. In this case, the outputs of the current sensors 35 are directly connected to the FC converters 244.

Figure 11:
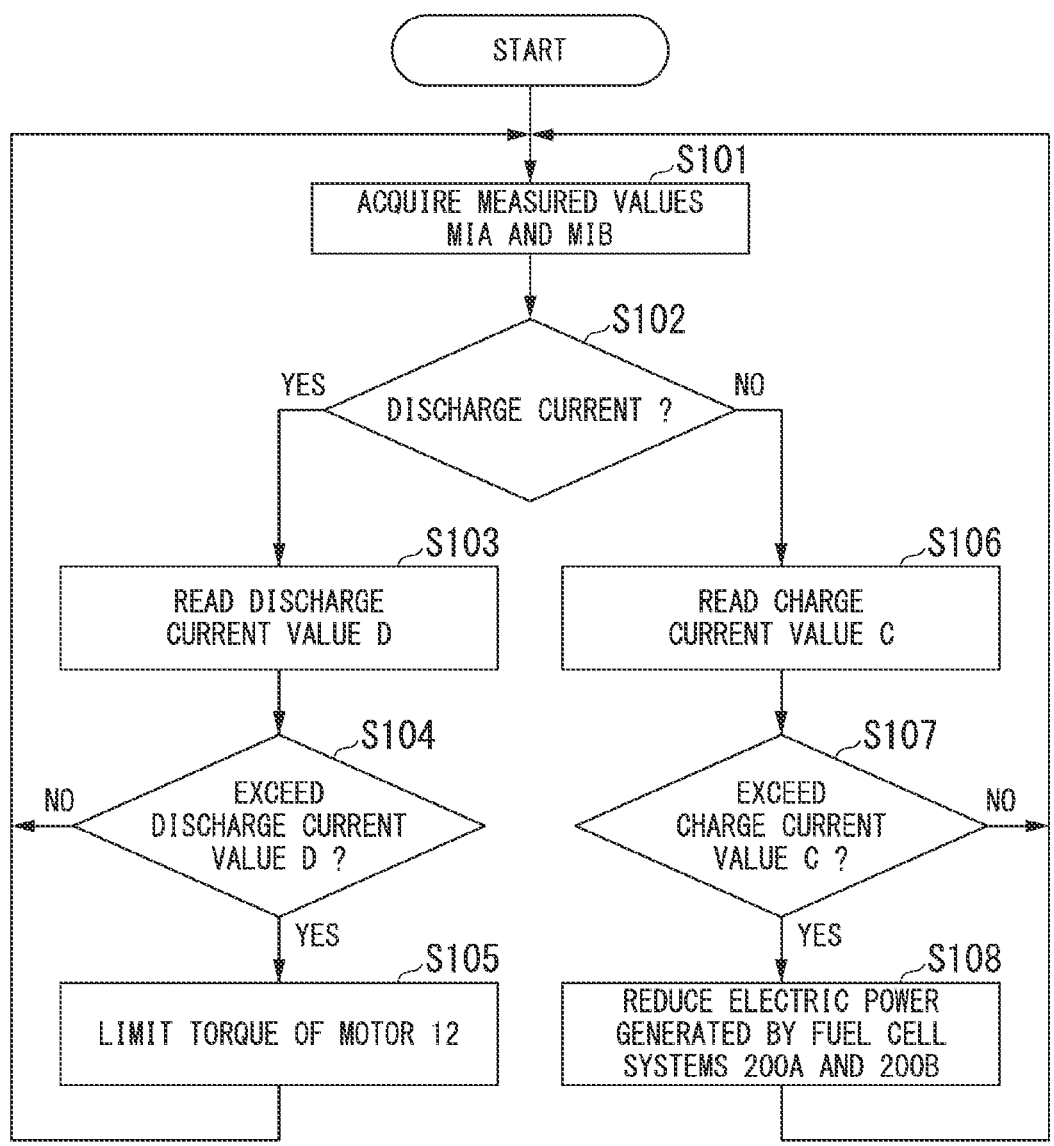
FIG. 11 is a flowchart illustrating an operation example of a power supply control process that the control unit 100 performs on the drive unit 4 #.

FIG. 11 is a flowchart illustrating an operation example of the power supply control process performed by the control unit 100 on the drive unit 4 #.

The power control unit 333 # performs the operation of the flowchart of FIG. 11 after supplying the required electric energy for the motor 12 to obtain the required torque to each of the drive units 4A # and 4B # on the basis of the output of the vehicle sensor.

The power control unit 333 # acquires the acquired value MIA, which is the current value of the current IA, from the current sensor 35A, and acquires the acquired value MIB, which is the current value of the current IB, from the current sensor 36B (step S101). Then, the power control unit 333 # determines whether the polarities of the acquired values MIA and MIB are positive (discharge current from the battery 40 to the battery converters 34A and 34B) or negative (charge current from the battery converters 34A and 34B to the battery 40) (step S102). At this time, when the polarities of the acquired values MIA and MIB are positive (YES), the power control unit 333 # determines that the discharge current is flowing from the batteries 40A and 40B, and proceeds to step S103. On the other hand, when the polarities of the acquired values MIA and MIB are negative (NO), the power control unit 333 # determines that the charge current to the batteries 40A and 40B is flowing, and proceeds to step S106.

Then, the power control unit 333 # reads the discharge current value D set as the threshold value of the discharge current from the storage unit 150 (step S103). The power control unit 333 # compares the acquired values MIA and MIB with the read discharge current value D, and determines whether the acquired values MIA and MIB exceed the discharge current value D (step S104). At this time, the power control unit 333 # proceeds to step S105 when the acquired values MIA and MIB exceed the discharge current value D. On the other hand, the power control unit 333 # proceeds to step S101 when the acquired values MIA and MIB are equal to or less than the discharge current value D.

Subsequently, the power control unit 333 # reads the adjustment voltage value stored in correspondence with the discharge current value D from the storage unit 150 in order to limit the torque of the motor 12 (process to reduce the DC power consumed by the inverter 32), outputs a command to use the torque as the limit torque to the inverter 32, and outputs a command to change (decrease) the voltage value as the target value for controlling the voltage of the DC-side terminal of the inverter 32 to the battery converter 34A (step S105). As the torque of the inverter 32 decreases and the voltage value as the target value of the DC-side terminal decreases, the current value of the current IA that the battery converter 34A, which uses the voltage value of the DC-side terminal as a target value, allows to flow out from the battery 40A decreases. Then, the power control unit 333 # acquires the acquired value MIA from the current sensor 35A and sets the same as the target value for the current control of the battery converter 34B. As a result, the current IB flowing out from the battery 40B decreases corresponding to the current IA flowing out from the battery 40A.

The power control unit 333 # reads the charge current value C set as the threshold value of the charge current from the storage unit 150 (step S106). The power control unit 333 # compares the acquired values MIA and MIB with the read charge current value C, and determines whether the acquired values MIA and MIB exceed the charge current value C (step S107). At this time, the power control unit 333 proceeds to step S108 when the acquired values MIA and MIB exceed the charge current value C. On the other hand, the power control unit 333 # proceeds to step S101 when the acquired values MIA and MIB are equal to or less than the charge current value C.

Subsequently, the power control unit 333 # reads the adjustment voltage value stored in correspondence with the charge current value C from the storage unit 150 in order to limit the electric energy of the DC power generated by the fuel cell systems 200A and 200B (process to reduce the electric power generated by the fuel cell systems 200A and 200B). Then, the power control unit 333 # outputs a command to change (decrease the current value as the target value) the target value for current control to the read adjustment current value, which is supplied to the DC-side terminal of the inverter 32, to the fuel cell systems 200A and 200B (step S108). As the current value as the target value of the current control for the DC-side terminal decreases, the current value of the current IA that flows into the battery 40A via the battery converter 34A as the charge current decreases, and the current value of the current IB that flows into the battery 40B via the battery converter 34B as the charge current decreases.

In the power supply control system according to the embodiment described above, the drive units mounted on the electric vehicle 1 (an example of the electric device), each of which is provided with a fuel cell system and a battery, are operated in parallel to perform the operation of supplying power to the inverters connected in common in cooperation to generate a predetermined torque in one motor, and information on the discharge current and charge current is collectively processed by the control unit 100 between the drive units. The drive units can compare the discharge current and charge current of the batteries provided in the individual drive units with preset threshold values to control the discharge current and charge current to be set to default values, and by protecting the battery. Therefore, the deterioration of functions can be reduced by protecting the battery, and the system efficiency (power generation efficiency, power supply efficiency, and the like) of the fuel cell system can be improved further.

In the present embodiment, when the inverter 32 is controlled with the limit torque in order to reduce the discharge current from the battery 40, the control unit 100 changes the target voltage of the battery converter 34 (for example, the battery converter 34A of the drive unit 4A #) that performs voltage control, reads the acquired value MIA of the reduced current IA, changes this acquired value MIA as the current value of the target value of the battery converter 34B that performs current control, and adjusts the current value MIB according to (in synchronization with) the current value MIA. Therefore, the phenomenon of backflow of current from one battery to the other battery can be prevented. Moreover, the discharge current and charge current are be decreased to default values between different drive units, and the operations of power supply control for the inverters 32 can be performed easily in cooperation.

The embodiments for carrying out the present invention have been described with reference to the drawings, but the present invention is not limited to these embodiments and various modifications and substitutions can be made without departing from the gist of the present invention.

What is claimed is:

1. A power supply control system comprising:
   an electric device;
   an inverter connected to the electric device to perform conversion from DC power to AC power;
   a first drive unit including a first fuel cell system that includes a first fuel cell and supplies DC power to the inverter, a first voltage converter that controls a voltage of a DC-side terminal of the inverter, and a first battery connected to the first voltage converter;
   a second drive unit including a second fuel cell system that includes a second fuel cell and supplies DC power to the inverter, a second voltage converter that controls a current in the inverter, and a second battery connected to the second voltage converter; and
   a control unit that controls the inverter and/or the first fuel cell system so that a first current value flowing through the first battery reaches a target value of the first current value and controls the second voltage converter and/or the second fuel cell system so that a second current value flowing through the second battery reaches the target value of the first current value,
   wherein
   the control unit performs torque limit control to reduce a torque generated in the electric device by the inverter when the first current value and the second current value exceed a predetermined first threshold current value which is a threshold value of a discharge current for the first battery and the second battery, and
   wherein
   the control unit reduces DC power generated by the first fuel cell system when the first current value exceeds a predetermined second threshold current value set in advance and reduces DC power generated by the second fuel cell system when the second current value exceeds the second threshold current value.

2. The power supply control system according to claim 1, wherein
   the control unit performs current control on the second voltage converter such that an acquired value of the first current value in the first voltage converter is used as a target value of the current control.

3. The power supply control system according to claim 1, wherein
   the control unit is a first control unit in the first drive unit and a second control unit in the second drive unit, the power supply control system further comprising:
   a first current sensor that acquires the first current value used for controlling the first current value of the first voltage converter and outputs an acquired value to the first control unit;
   a third current sensor that acquires the first current value used for the current control of the second voltage converter and outputs the acquired value to the second control unit; and
   a second current sensor that acquires the second current value and outputs the acquired value to the second control unit.

4. The power supply control system according to claim 1, further comprising:
   a first current sensor that acquires the first current value and outputs an acquired value to the control unit; and
   a second current sensor that acquires the second current value and outputs the acquired value to the control unit.

5. A power supply control method for driving a power supply control system including:
   an inverter connected to an electric device to perform conversion from DC power to AC power;
   a first drive unit including a first fuel cell system that includes a first fuel cell and supplies DC power to the inverter, a first voltage converter that controls a voltage of a DC-side terminal of the inverter, and a first battery connected to the first voltage converter;
   a second drive unit including a second fuel cell system that includes a second fuel cell and supplies DC power to the inverter, a second voltage converter that controls a current in the inverter, and a second battery connected to the second voltage converter; and
   a control unit, wherein
   the control unit controls the inverter and/or the first fuel cell system so that a first current value flowing through the first battery reaches a target value of the first current value and controls the second voltage converter and/or the second fuel cell system so that a second current value flowing through the second battery reaches the target value of the first current value, wherein
   the control unit performs torque limit control to reduce a torque generated in the electric device by the inverter when the first current value and the second current value exceed a predetermined first threshold current value which is a threshold value of a discharge current for the first battery and the second battery, and
   wherein the control unit reduces DC power generated by the first fuel cell system when the first current value exceeds a predetermined second threshold current value set in advance and reduces DC power generated by the second fuel cell system when the second current value exceeds the second threshold current value.

* * * * *